W. L. MONRO.
GLASS FEEDING SYSTEM FOR DRAWING APPARATUS.
APPLICATION FILED FEB. 18, 1916. RENEWED APR. 26, 1917.
1,248,372.
Patented Nov. 27, 1917.
3 SHEETS—SHEET 3.
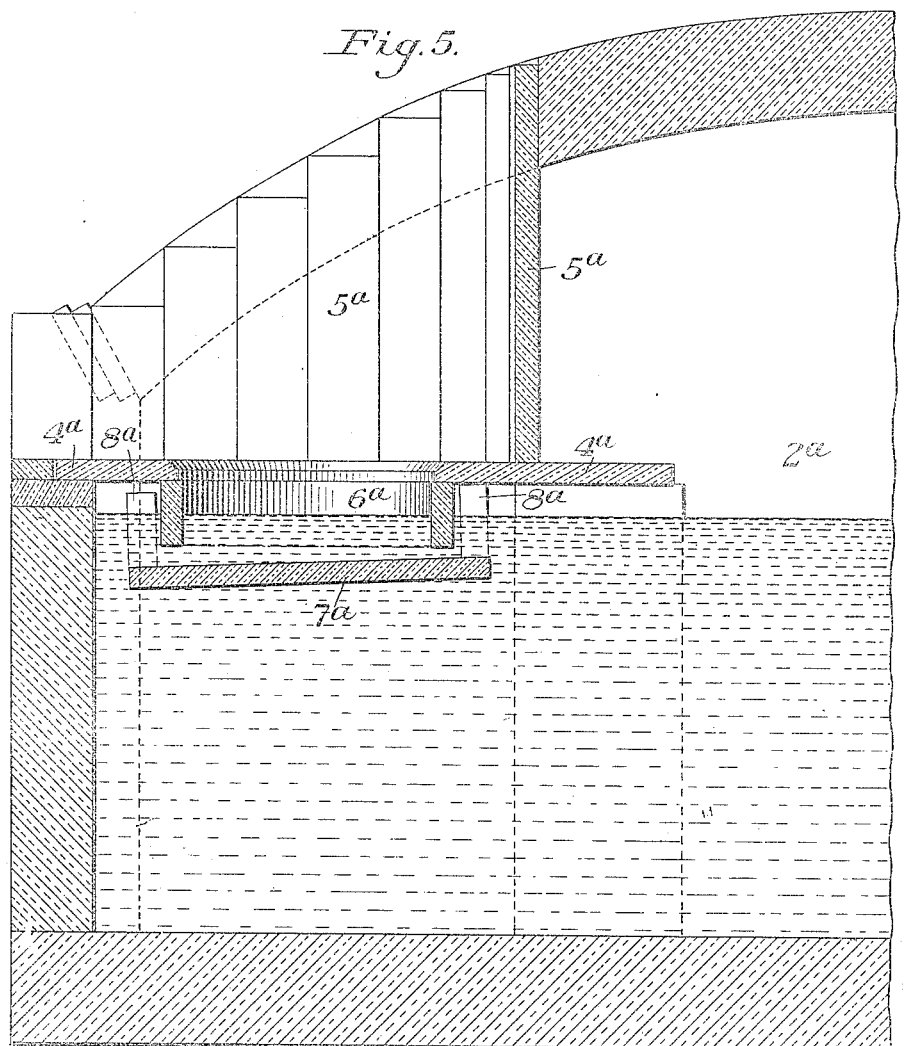
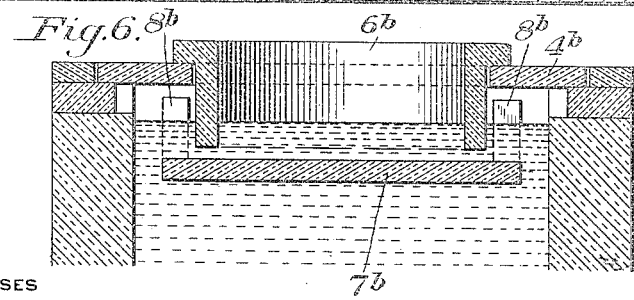

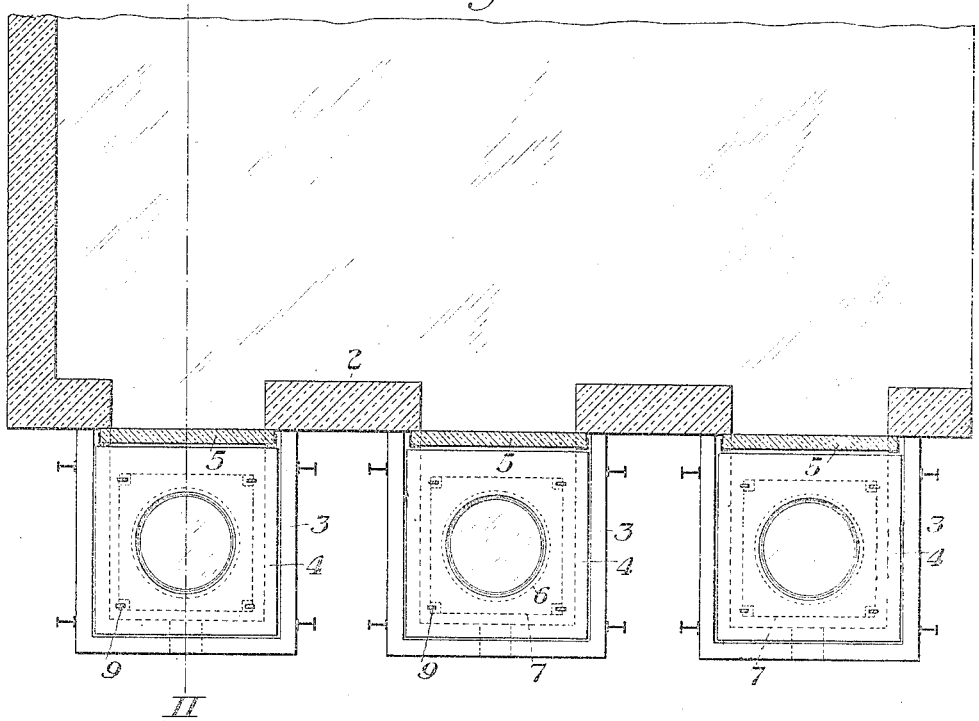
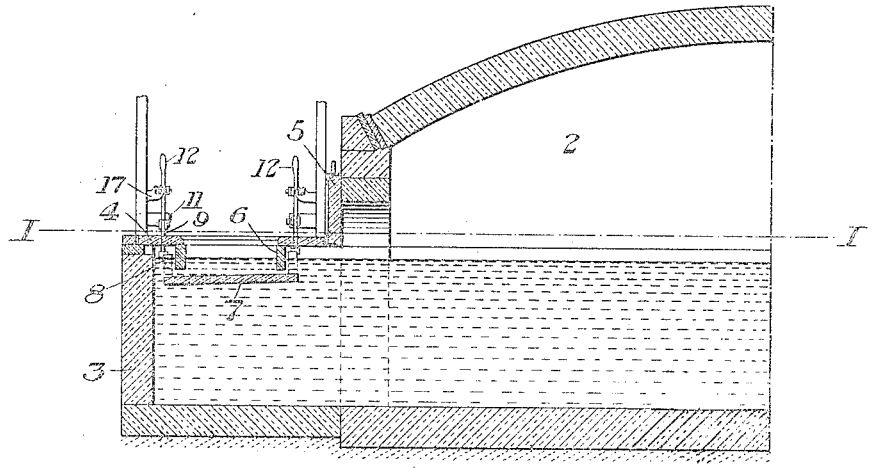

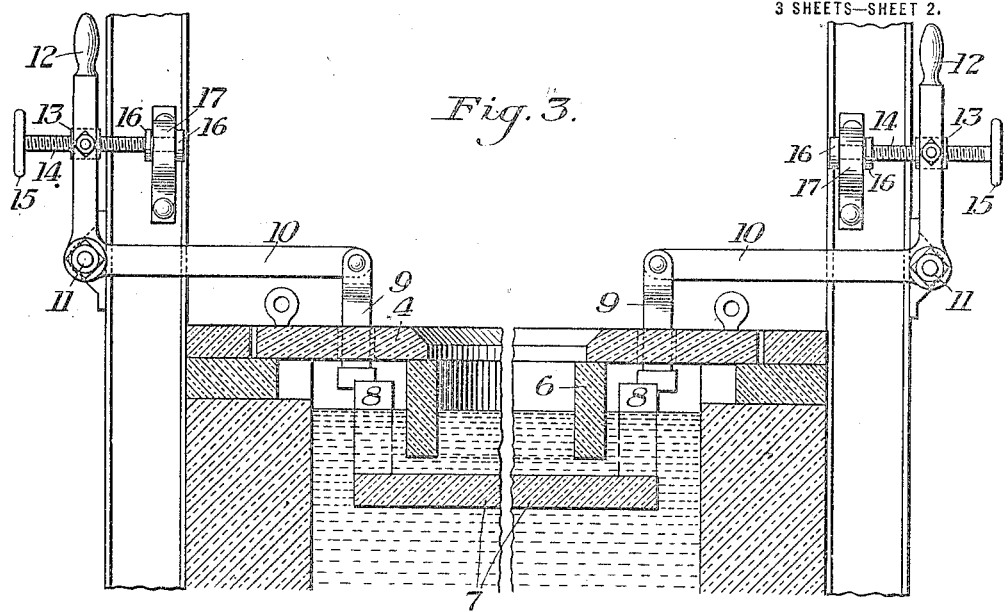
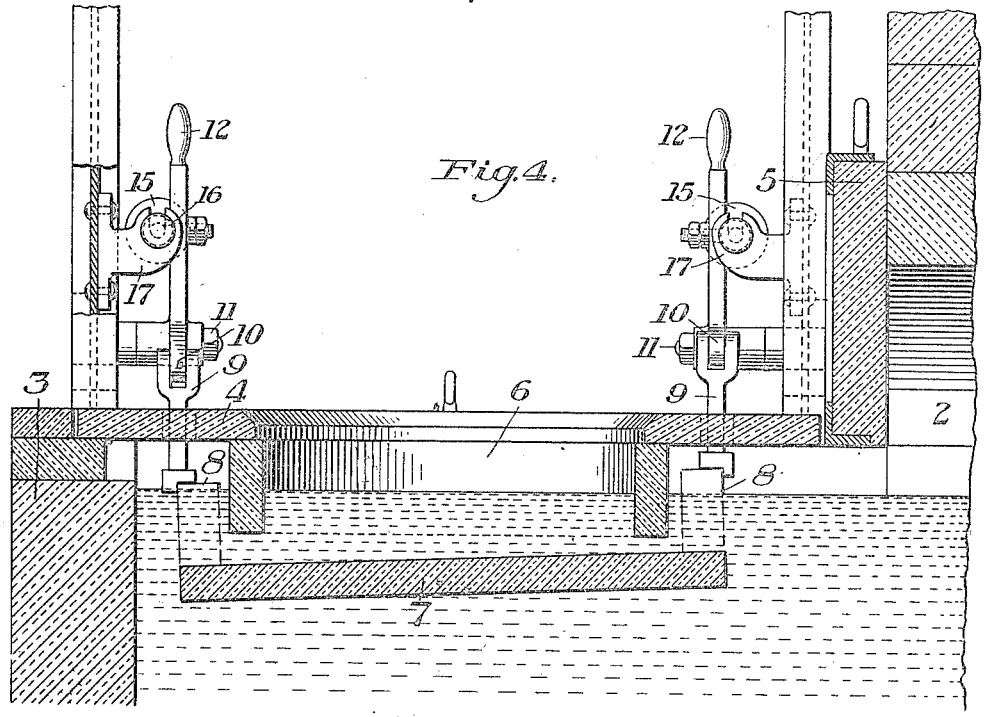

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

GLASS-FEEDING SYSTEM FOR DRAWING APPARATUS.

1,248,372. Specification of Letters Patent. Patented Nov. 27, 1917.

Application filed February 18, 1916, Serial No. 79,059. Renewed April 26, 1917. Serial No. 164,786.

*To all whom it may concern:*

Be it known that I, WILLIAM L. MONRO, a citizen of the United States, residing at Pittsburgh, Allegheny county, Pennsylvania, have invented a new and useful Glass-Feeding System for Drawing Apparatus, of which the following is a full, clear, and exact description, reference being had to the accompanying drawings, forming part of this specification, in which—

Figure 1 is a sectional plan view showing a portion of a tank furnace provided with extensions having my improved feed system, taken on the line I—I of Fig. 2.

Fig. 2 is a vertical section on the line II—II of Fig. 1.

Fig. 3 is an enlarged detail view, partly broken away, showing the adjusting means.

Fig. 4 is a view at right angles to Fig. 3 showing the diaphragm adjusted to angular position.

Fig. 5 is a vertical section corresponding to Fig. 2 showing a modified form of furnace, and Fig. 6 is a sectional view of another modified form.

My invention relates to the drawing of glass from a glass bath forming a portion or extension of the bath in the tank furnace; that is, a glass bath which is constantly connected with the glass in the furnace.

In such drawing operation a refractory ring usually incloses a portion of the bath from which the glass is drawn, and it has been proposed to use a diaphragm below this ring to control the glass entering the ring.

The portion of the glass bath containing the ring is at different temperatures, the outer portion nearest the wall being, as a whole, colder than the portions nearer the main bath; and I have found that by adjusting one portion of the diaphragm relative to another portion of the diaphragm, I can regulate the glass entering the drawing ring in such a way as to better equalize the temperature of the glass therein, and thus obtain glass of more uniform thickness around its circumference. By thus adjusting one portion of the diaphragm relative to another portion, I can keep a deeper body of glass in one portion of the ring, than in another portion, and thus compensate for the differing temperatures of the glass entering the ring from the different portions around it. The deeper portion of glass in the ring will keep hotter than the shallower, and take less of the chill from the diaphragm, and thus equalize the glass in the ring, the adjusting means thus compensating for the temperatures which vary from time to time.

In the drawings, referring to the form of Figs. 1 to 4, inclusive, 2 represent the tank furnace having fore-hearth or dog-house extensions 3 along the end, each of these portions being provided with a topstone 4, between which and the furnace an adjustable shield 5 may be used. 6 is the refractory floating ring surrounding the drawing opening in the topstone, and 7 is the floating refractory diaphragm beneath it and preferably of larger area than the ring. This diaphragm is provided with upwardly projecting refractory posts 8 which are preferably above the level of the glass bath, and are engaged by the vertically movable adjusting links 9. I have shown four of these adjusting devices at the four corners of a square diaphragm; but it will be understood that the shape of the diaphragm may be changed, as well as the number of adjusting devices without departing from my invention. In the form shown, the links 9 are connected to the inner ends of bell crank levers 10 pivoted to the framework at 11. The other arm of this bell crank is formed as a handle 12, and this handle is loosely pinned to an internally threaded sleeve 13 screwed on a screw threaded stem 14 having an outer hand wheel 15. The inner end of the stem is provided with collars 16 arranged on each side of a forked bearing 17. When the threaded stem is in the position shown, adjustments are made by turning the hand wheels 15. If more rapid adjustment is desired, the hand wheels are tipped downwardly to throw the inner ends of the threaded stems out of their bearings, and the lever 12 then actuated as a hand lever.

It will be evident that by acting on these several adjusting devices the depth of one portion of the diaphragm may be shifted relative to that of another part so that the diaphragm may be forced into any desired horizontal angular position under the drawing ring. The drawing ring preferably floats in the bath, though it may be secured to the topstone.

In Fig. 5 I show a form similar to that of Figs. 1 to 4, except that the fore-hearth portions are cut into the body of the furnace, and the adjusting devices are omitted for the sake of clearness. In this figure, parts similar to those of Figs. 1 to 4 are marked with similar numerals with the letter "a" applied. In this case the vertically adjustable shield 5 of Figs. 2 and 4 takes the form of a permanent shield 5a, formed by a plurality of slabs or blocks built around the drawing opening; and the topstone 4a preferably extends inwardly within this shield. The shield in this case is preferably of semicircular form so as to cut off the heat of a tank from the portion of the topstone through which the draw is made.

In Fig. 6 I have shown a form similar to that shown in Fig. 5, and in which I have used the same reference characters, with the letter "b" applied. In this construction the refractory ring 6b is provided with a flange for supporting it on the topstone 4b.

The advantages of my invention will be apparent to those skilled in the art, since by tipping one portion of the diaphragm relative to another, variations in the temperature of the glass may be compensated for and a better quality glass thus obtained, particularly as to even thickness throughout.

The device may be used for drawing cylinders, sheets or other forms, and many variations may be made in the form and arrangement of the diaphragm and other parts without departing from my invention.

The refractory rings may be floated in and out of the furnace, if desired. That is, after the drawing operation, the ring may be pushed back into the bath of glass in the furnace proper so as to refine the glass therein, and another ring with fresh glass moved into the drawing position.

I claim:

1. In glass-drawing apparatus, a furnace having a drawing opening, a submerged diaphragm below the drawing opening, and means for adjusting one part of the diaphragm relative to another part thereof, substantially as described.

2. In glass-drawing apparatus, a furnace having a drawing opening and a shield surrounding the drawing opening dipping in the glass, a movable diaphragm beneath the shield, and means for adjusting one portion of the diaphragm relative to another portion thereof, substantially as described.

3. In glass-drawing apparatus, a floating diaphragm having upwardly projecting refractory post portions arranged to extend above the level of the bath, and mechanism engaging said post portions for adjusting the level of one part of the diaphragm relative to that of another part thereof, substantially as described.

4. In glass-drawing apparatus, a floating diaphragm having upwardly projecting refractory post portions arranged to extend above the level of the bath, and adjusting mechanism engaging a plurality of said post portions, and adapted to adjust the level of one part of the diaphragm relative to another part thereof, substantially as described.

5. In glass-drawing apparatus, a furnace having a drawing opening with a topstone, a refractory shield surrounding the opening and dipping into the glass, a submerged diaphragm below the shield, and mechanism for adjusting one portion of the shield relative to another portion thereof, substantially as described.

In testimony whereof, I have hereunto set my hand.

WILLIAM L. MONRO.

Witnesses:
 GEO. H. PARMELEE,
 H. M. CORWIN.